Feb. 25, 1930. K. SUNDBERG 1,748,659
METHOD AND APPARATUS FOR MAGNETIC PROSPECTING
Filed May 2, 1927
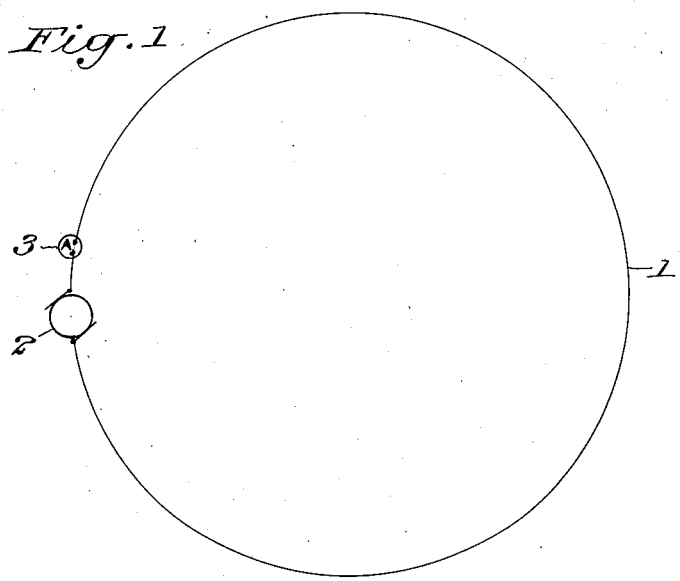
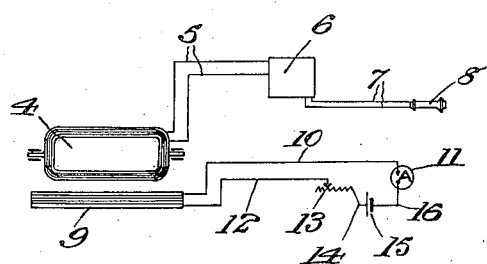
INVENTOR
Karl Sundberg
BY
his ATTORNEYS Patented Feb. 25, 1930

1,748,659

UNITED STATES PATENT OFFICE

KARL SUNDBERG, OF STOCKHOLM, SWEDEN, ASSIGNOR, BY MESNE ASSIGNMENTS, TO AKTIEBOLAGET ELEKTRISK MALMLETNING, OF STOCKHOLM, SWEDEN, A JOINT-STOCK COMPANY LIMITED

METHOD AND APPARATUS FOR MAGNETIC PROSPECTING

Application filed May 2, 1927. Serial No. 188,259.

This invention relates to method and apparatus for magnetic prospecting and, more particularly, to method and apparatus whereby investigations are made according to the magnetic characteristic of bodies as distinguished from, for instance, their electrical conductivity.

The invention has for an object to provide method and apparatus whereby many bodies in the earth may be located and their nature and extent determined by reference to their magnetic characteristics; and whereby the main difficulties that have previously handicapped this form of magnetic prospecting are overcome.

Another object consists in providing method and apparatus whereby bodies different from mineral ores may be investigated, such, for instance, as oil, salt, etc. A further object consists in providing method and apparatus that are simple in operation and construction and which may readily be utilized in all localities under all conditions.

A further object consists in providing certain improvements in the steps followed and in the form, construction and arrangement of the parts whereby the above named and other objects may effectively be obtained.

A practical embodiment of an apparatus setting forth the mechanical part of my invention and adapted for use in the method part, is represented in the accompanying drawing in which Fig. 1 represents a diagrammatic plan view of the primary coil and connected parts, and Fig. 2 represents a diagrammatic plan view of the secondary coils and reading parts.

Previously known methods and apparatus for use in magnetic prospecting generally speaking have been successful only in connection with strong magnetic bodies, such as magnetic iron ores and the like; and the instruments used have been comparatively inaccurate. In prospecting for weakly magnetized ores and for other bodies, such, for instance, as oil, or salt, the previous methods and apparatus have been ineffective because instruments of great accuracy and delicacy are required owing to the fact that the differences in the magnetic properties of the weakly magnetized bodies and the surrounding earthy substances are very slight.

In making efforts to increase the accuracy of magnetometers of common construction, a point of highest possible sensitiveness is soon reached, because of the influence of temperature changes. This influence is especially important as respects the bearings of magnetometers, and it is of substantial importance as affecting the magnetic characteristic of the magnets used in the usual construction of such meters.

Another difficulty which has been encountered in efforts to conduct accurate magnetic investigations in this character of work resides in the fact that the earth's magnetic field changes at different times of the day, and it is this field which hitherto has always been attempted to be investigated in magnetic prospecting.

A third obstacle to obtaining the desired accuracy in these investigations as previously attempted has resided in the fact that the direction of the earth's magnetic field is different at different points on the earth's surface. Since the strength of the anomaly in the earth's magnetic field caused by a certain body will change when there is change in the direction of the earth's magnetic field, a body which would produce a rather strong magnetic anomaly in one place where the direction of the earth's field is favorable, might give a very weak anomaly, or none at all, at another place where the direction of the earth's field is less favorable in this respect.

My invention is calculated to overcome these three serious handicaps that have hitherto prevented magnetic investigations of any substantial value except in cases of strong magnetic bodies, and to provide method and apparatus for magnetic electrical prospecting whereby magnetic fields may be investigated and weak magnetic bodies determined as to location, form, and character.

The invention broadly comprehends establishing an artificial magnetic field in the earth as, for instance, by use of a direct current passing through a closed loop laid out on the earth's surface, and making determinations by measurements with respect to said field. Such measurement may be made by the employment of a revolving coil placed within the magnetic field and connected to an amplifier and telephone receiver, together with a compensating coil through which a direct current of desired strength may be sent, thereby establishing a compensating magnetic field which can be adjusted so as to equalize the artificial magnetic field to be measured.

Referring to the embodiment of the apparatus diagrammatically represented in the drawing; a coil or loop of wire is marked 1 and it has its ends connected to the poles of a suitable source of direct current such as a generator 2. An approved form of measuring instrument such as an ammeter 3 is placed in circuit with the loop 1.

In using this portion of the apparatus, the coil or loop of wire 1 is laid out on the earth's surface covering a suitable area. The length of the wire may, for instance, be a mile. An ammeter is placed in circuit with the loop and the free ends of the loop are connected with the poles of a direct current generator that is appropriately supported. When the current is turned on, an artificial magnetic field will be established by the loop, and the direction and strength of this field may be altered by changing the angularity of the loop and the size thereof. Change in angularity will change the direction of the field and change in size will change the strength. The strength may also be changed, of course, by increasing or decreasing the current sent out from the generator. I call the artificial field thus established the primary field.

The devices shown in Fig. 2 consist of a coil 4 that is intended to be mounted for rotation by hand or by suitable power. This coil is connected by wires 5 to an amplifier 6; and the amplifier is connected by wires 7 to a telephone receiver 8.

Adjacent the rotating coil 4 is located a compensating coil 9 that is stationary. A wire 10 connects one terminal of this coil to one terminal of an ammeter 11. Another wire 12 connects the other terminal of the coil 9 to a variable resistance unit 13 which is connected by a wire 14 to one terminal of a suitable source of direct current, such, for instance, as a dry cell 15. The other terminal of the dry cell is connected by a wire 16 to the second terminal of the ammeter 11.

When using the apparatus to carry out my method, the parts shown in Fig. 2 are placed within the artificial field established by the parts shown in Fig. 1. The coil 4 is rotated while the receiver 8 is held to the ear of the operator and the resistance unit 13 is adjusted until there is silence.

For any given shape, size, and position of the loop 1, the artificial primary magnetic field can be mathematically calculated if the strength of the current sent through the loop is known. This strength is readily determined by the ammeter 3. If the magnetic permeability of the adjacent earthy materials, such, for instance, as rocks, which the primary field penetrates, differs from the constant 1, which indicates a non-magnetic characteristic, the primary field will be, at said point, changed into a new magnetic field, which I choose to call the resulting field. The geometric difference between this resulting field and the primary field, constitutes another magnetic field that I choose to call the secondary field.

By determining the secondary field, the position of underground bodies with higher magnetic permeability than the surrounding materials, e. g., rocks, such bodies being, for instance, most ores, can be ascertained. Likewise, the position of underground bodies with lower magnetic permeability such, for instance, as rock salt, can be ascertained. Furthermore, the structure of the underground strata can be made known as, for instance, the presence and position of anticlines and synclines which relate, particularly, to investigations for oil.

In following out my procedure, the apparatus is operated as above described and, when a point is reached in the adjustment of the resistance unit 13 at which no sound is heard through the telephone receiver 8, readings are taken on the ammeters 11 and 3. The reading of the ammeter 11 gives the strength of the field established by the compensating coil 9 and which may be referred to as the compensating field. This is equal to the actually existing field at the moment and it is the sum of the above described resulting field and the earth's magnetic field at this point.

Next, the operator shuts off the current flowing from the generator 2 and again uses the devices shown in Fig. 2 as above described. The reading of the ammeter 11 resulting from this use of the said devices will give the strength of the earth's magnetic field at this point. Now, by subtracting this last reading from the previous reading of the ammeter 11, the strength of the earth's magnetic field is subtracted from the actually existing field and the above described resulting field is determined.

Since the primary field above described is already known as a result of mathematical calculation, the above described secondary field may be determined by subtracting the primary field from the resulting field.

Of course, as many of these sets of readings as are desired may be taken at various points within the artificial field established by the loop 1 and generator 2; and these sets of readings will ascertain the positions of underground bodies having greater or less magnetic permeability than have the surrounding earthy substances, e. g., rocks. The character and form or size of the said bodies may likewise be determined with much accuracy.

While the apparatus is in use changes may occur, from time to time, in the strength of the current imparted to the loop 1, and, in order to overcome any inaccuracies which might result from this, it is practicable to connect wires 14 and 16 with the generator 2 so that any changes in the direct current imparted to the loop 1 will be correspondingly imparted to the compensating coil 9. When the apparatus is arranged in this way it is not necessary to employ either the ammeter 3 or the ammeter 11, because the readings may be taken on the resistance unit 13.

It will be seen that the method and apparatus above described overcome the three previously existing difficulties or obstacles above named, because I use an artificial magnetic field of exactly known strength as a primary field instead of using the changing magnetic field of the earth; also because this artificial magnetic primary field can be changed to suit varying conditions; and further because the apparatus eliminates magnets so that the influence of temperature changes is reduced to a minimum.

It may be noted that the devices shown in Fig. 2 of the drawing, and described hereinabove, may be advantageously used in known methods whereby the calculation is based upon determinations of the earth's magnetic field; so that the said devices are not limited in their applicability to the particular method described herein.

It will be understood that various changes may be resorted to in the steps followed, material employed, and in the form, construction and arrangement of the several parts without departing from the spirit and scope of my invention; hence, I do not intend to be limited to the details herein shown and described except as they may be included in the claims.

What I claim is:

1. A method of magnetic electrical prospecting which includes, establishing an artificial magnetic field by use of a direct current through a loop or the like insulated from the ground, and determining the strength of the artificial field at any given point to detect magnetic anomalies therewithin.

2. A method of magnetic electrical prospecting which includes, establishing a primary magnetic field by use of a direct current, calculating the strength of said primary field, determining the strength of the magnetic field resulting from the influence of underground bodies upon the primary field, and determining the field constituted by the geometric difference between the primary field and the resulting field.

3. Apparatus for magnetic electrical prospecting comprising, a loop or the like insulated from the ground, means for imparting a direct current to said loop, a compensating coil, means for imparting a direct current to said coil, and devices for determining when the magnetic field established by the compensating coil equals the magnetic field established by the loop.

4. Apparatus for magnetic electrical prospecting comprising, a loop or the like insulated from the ground, means for imparting a direct current to said loop, a compensating coil, means for imparting a direct current to said coil, and a rotating coil in association with said compensating coil for measuring the magnetic field established by the loop.

5. Apparatus for magnetic electrical prospecting comprising, a loop or the like insulated from the ground, means for imparting a direct current to said loop, a compensating coil, means for imparting a direct current to said coil, a rotating coil in association with said compensating coil for measuring the magnetic field established by the loop, an indicator connected with the rotating coil and an indicator connected with the compensating coil.

In testimony that I claim the foregoing as my invention, I have signed my name this 29th day of April, 1927.

KARL SUNDBERG.